May 14, 1957 C. W. A. MUNDY ET AL 2,792,410
PRODUCTION OF CYCLOPENTADIENE COMPOUNDS
Filed Jan. 24, 1955
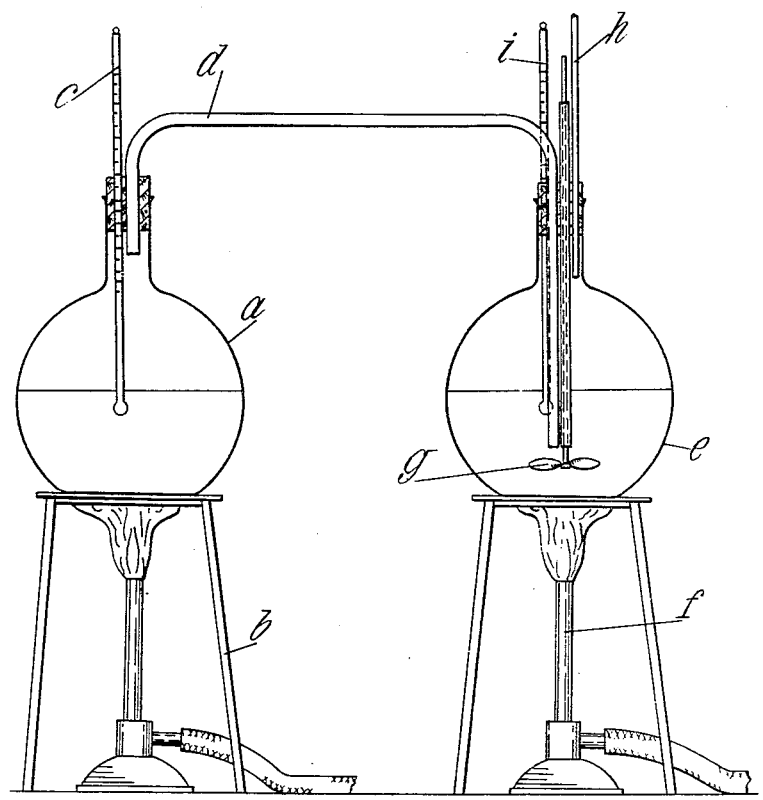
Inventors,
Cecil W. A. Mundy,
Cyril R. Malyan,
by Hall & Houghton,
Attorney.

United States Patent Office 2,792,410
Patented May 14, 1957

2,792,410
PRODUCTION OF CYCLOPENTADIENE COMPOUNDS

Cecil Walter André Mundy and Cyril Rixton Malyan, London, England, assignors to Younghusband Barnes & Co. Limited, London, England Application January 24, 1955, Serial No. 483,690

3 Claims. (Cl. 260—407)

This invention relates to the production of cyclopentadiene compounds particularly in connection with the production of reactive hydrocarbon/drying oil reaction products and copolymers and is a continuation-in-part of that in our copending application Serial Number 396,048 filed on December 3, 1953, abandoned in favor of the present application on October 25, 1956.

Methods of combining cyclopentadiene with drying oils and semi-drying oils and their admixtures by liquid/liquid phase methods, under pressure, under reflux conditions or dropwise have been previously described.

These methods give rise to reactions which appear to be simultaneous, in which poly-cyclopentadiene is produced, giving rise in the case of cyclopentadiene/oil materials to insoluble, suspended particles.

The object of the present invention is to provide a process free from the above disadvantage, that is to say a process for the rapid reaction of cyclopentadiene with drying oils and semi-drying oils and their admixtures with the production of a product completely free from insoluble, suspended particles, and from unconjugated and conjugated oils alike.

Attention is drawn to the following prior art namely: Lycan Patent No. 2,443,044 of June 8, 1948, and an article entitled "Co-polymerisation" by A. G. Hovey in the Journal of the American Oil Chemists' Society for November 1950, pages 481 to 491. The Lycan patent specification 2,443,044 describes a method of preparing an addendum copolymer of an unsaturated glyceride oil and a hydrocarbon of a class consisting of cyclopentadiene and the lower polymers thereof up to the pentamer, which method comprises admixing said oil and said hydrocarbon in a closed system at a temperature within a range of about 450 to 600° F. and reacting the mixture while it is at said temperature until the pressure of the reaction mixture drops substantially to zero and a product soluble in petroleum naphtha is formed.

This is a pressure or autoclave process in which the reactants are together in three phases namely the liquid phase of the oil, the liquid phase of the cyclopentadiene and the gaseous phase thereof.

Hovey largely summarises the art and on page 488 dealing with cyclopentadiene writes "This is obtained by heating the dimer. If it is distilled from the dimer at a temperature of approximately 180° C. so that the vapour temperature at the top of the column is held at 39–42° C., it may be condensed with an ordinary water condenser, but the receiver must be surrounded by ice to retard polymerization. Cyclopentadiene repolymerizes rather rapidly to dicyclopentadiene. In drying oil copolymerization reactions using dicyclopentadiene, the freshly generated cyclopentadiene gas, in something like a nascent state, reacts with the oil radicals instead of reverting to the dimer. In an autoclave none of the cyclopentadiene gas can be lost and if the heating is not too strong, the reaction with the oil radicals removes the gas as it is formed from the dimer and helps to regulate the pressure."

Hovey therefore says in the paragraph cyclopentadiene reacts with oil radicals and the best way to effect the reaction is to put the ingredients into an autoclave; here again a three phase process as with Lycan is involved.

According to the present invention we use a two phase reaction, the phases of the reactants being the liquid phase of the oil and the gaseous phase of cyclopentadiene giving an improved process and improved products.

The invention consists in a process for the production of cyclopentadiene compounds particularly in connection with the production of reactive hydrocarbon/drying oil reaction products and copolymers in which cyclopentadiene or di-cyclopentadiene cracked to cyclopentadiene is reacted in the gas/liquid phase with drying oils and semi-drying oils and their admixtures, when cyclopentadiene forms the gas phase and oil the liquid phase, the oil being heated in the liquid phase to a temperature in the range 300–500° F., and there being introduced into the heated oil from 1 to 400% by weight thereof of cyclopentadiene in the gaseous phase in a stream at atmospheric pressure.

The invention also consists in a process in accordance with the preceding paragraph in which the polymers produced are heat treated to yield stand oils.

The invention further consists in products when made by the processes of either of the preceding two paragraphs.

The following example illustrates how the invention may be carried into effect, namely:

Example 100 parts of linseed oil are heated to a temperature of 450° F., when 20 parts of cyclopentadiene are introduced in the vapour phase in a continuous stream over a period of 10 hours, the temperature remaining at 450° F. throughout. Rapid reaction occurs with the production of cyclopentadiene/oil copolymers which may be heat-treated at a temperature of 450/600° F., to yield stand oils, or may be used as such in such processes and uses as drying oils are part.

A simple form of apparatus for carrying out the reaction using cyclopentadiene prepared by cracking dicyclopentadiene is illustrated in the accompanying diagrammatic drawing.

In this apparatus dicyclopentadiene contained in a flask $a$ is heated by burner $b$ until it reaches a steady temperature indicated by a thermometer $c$. The vapour which is cyclopentadiene in vapour or gaseous form resulting from cracking the dicyclopentadiene passes by way of a pipe $d$ into a flask $e$ heated by a burner $f$ and containing the oil.

The flask $e$ is provided with a high speed stirrer $g$, a vent $h$ and a thermometer $i$. The oil in flask $e$ is heated to a temperature of 300–500° F., preferably 450° F., before the cyclopentadiene as a gas or vapour is admitted. The oil is maintained within the aforesaid temperature range as the resulting reaction proceeds. The rate of evolution of cyclopentadiene in flask $a$ and its admission into the oil in flask $e$ are controlled by controlling the burner $b$ in such a way that all is seen to be reacting and none escaping at the vent $h$. The pressure is substantially atmospheric.

General

The amount of cyclopentadiene used may be from 1 to 500 parts by weight for each 100 parts of the oil. The period during which it is introduced in the vapour phase into the oil may be from 1 to 400 hours. The temperature range in the reactor may be from 300 to 500° F. which the continuous stream of cyclopentadiene at atmospheric pressure permits.

Instead of linseed oil any drying oil which term includes semi-drying oils may be used separately or in admixture, for instance: conophor, stillingia, perilla, isano, tobaccoseed, soya, niger, dehydrated castor, tung and oiticica oils; oil/resin combinations are also suitable such as drying oil/run copal/alkyd/phenolic resin combinations, as well as colophony additions, and styrene/oil combinations.

The process may be carried out as a batch process or, preferably, as a continuous process, the two reactants, the oil a liquid and the cyclopentadiene a gas or vapour, being fed into a reactor in the necessary proportion and withdrawn at an equivalent rate.

We claim:

1. A method for the production of cyclopentadiene/drying-oil reaction products and copolymers which consists in heating a drying oil, selected from the class consisting of drying and semi-drying oils, in the liquid phase to a temperature in the range of 300–500° F., and introducing into the so heated oil in a stream from 1 to 400% by weight thereof of cyclopentadiene in the gaseous phase while maintaining the oil at atmospheric pressure and within said temperature range.

2. A method for the production of stand oil which consists in heating a drying oil, selected from the class consisting of drying and semi-drying oils, in the liquid phase to a temperature in the range of 300–500° F., introducing into the so heated oil in a stream from 1 to 400% by weight thereof of cyclopentadiene in the gaseous phase while maintaining the oil at atmospheric pressure and within said temperature range, and then heating the reaction product in the temperature range 450 to 600° F.

3. A method according to claim 1, in which the cyclopentadiene is derived by distillation from dicyclopentadiene at about atmospheric pressure and about 356° F., in a zone separate from the oil reaction zone, the distilled cyclopentadiene being fed directly from the distillation zone in a stream into the heated oil approximately at such distillation temperature.

References Cited in the file of this patent

UNITED STATES PATENTS 2,443,044     Lycan et al. _____ June 8, 1948

OTHER REFERENCES

Hovey: "Copolymerization," J. of Am. Oil Chem. Soc., vol. 27, pages 481–491 (1950).